(12) United States Patent
Ogasawara et al.

(10) Patent No.: US 7,577,966 B2
(45) Date of Patent: Aug. 18, 2009

(54) DISK APPARATUS

(75) Inventors: Shinya Ogasawara, Yokohama (JP); Shingo Kage, Kobe (JP); Yukihiro Araki, Fujiidera (JP); Nobuyuki Miroku, Ikoma (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 10/576,383

(22) PCT Filed: Oct. 18, 2004

(86) PCT No.: PCT/JP2004/015379

§ 371 (c)(1),
(2), (4) Date: Apr. 19, 2006

(87) PCT Pub. No.: WO2005/038797

PCT Pub. Date: Apr. 28, 2005

(65) Prior Publication Data

US 2007/0150908 A1    Jun. 28, 2007

(30) Foreign Application Priority Data

Oct. 20, 2003    (JP)    ............................. 2003-359772

(51) Int. Cl.
*G11B 17/04* (2006.01)
(52) U.S. Cl. .................................... 720/624
(58) Field of Classification Search ................. 720/624, 720/625, 646, 647, 713; 360/99.02, 99.03, 360/99.06, 99.07; 369/77.11; 382/317
See application file for complete search history.

(56) References Cited

U.S. PATENT DOCUMENTS 5,022,023 A * 6/1991 Toyoguchi .................. 720/624
5,260,925 A * 11/1993 Camps et al. ............... 720/624
5,710,844 A * 1/1998 Capps et al. ................. 382/317
6,779,190 B2 * 8/2004 Akatani et al. .............. 720/624
7,107,603 B2 * 9/2006 Tuchiya ..................... 720/713
2003/0039194 A1    2/2003 Tanaka et al.
2004/0076104 A1 * 4/2004 Kato et al. .................. 369/77.1

FOREIGN PATENT DOCUMENTS

| EP | 1035541 | 9/2000 |
| EP | 1087386 | 3/2001 |
| JP | 07-272417 | 10/1995 |
| JP | 10003722 | 1/1998 |
| JP | 2000090529 A * | 3/2000 |
| JP | 2001110116 | 4/2001 |
| JP | 2002-140850 A | 5/2002 |
| JP | 2002298482 | 10/2002 |
| JP | 2003120776 | 4/2003 |
| JP | 3095682 U | 5/2003 |
| JP | 2003-168254 A | 6/2003 |

* cited by examiner

*Primary Examiner*—Tianjie Chen
(74) *Attorney, Agent, or Firm*—Harness, Dickey & Pierce, PLC

(57) ABSTRACT

The present invention provides a disk apparatus reduced in size, thickness and weight, by reducing a space for carrying a disk and a space between the floating unit and the stationary frame for use in holding the floating unit in a floating state, as much as possible, with a simple structure. In the disk apparatus of the present invention, the floating unit held in a floating state in the stationary frame is so arranged that the roller arm can rotate itself, pressing a disk-shaped recording medium onto the disk guide provided on the stationary frame, to carry the disk-shaped recording medium to a desired position.

10 Claims, 13 Drawing Sheets

DISK APPARATUS

TECHNICAL FIELD

The present invention relates to a disk apparatus which records and/or reproduces data on or from a disk-shaped recording medium such as CD, DVD or the like, and in particular, to the disk-loading mechanism for a disk-shaped recording medium for use in a disk apparatus.

BACKGROUND OF THE INVENTION

Disk apparatuses which record data on and/or reproduce data from disk-shaped recording media (hereinafter referred to as disks) such as CD, DVD, etc. are today reduced in size, thickness and weight suitable for portable use or for equipment on vehicles. In a disk apparatus of this type, the block having a turn table and a spindle motor mounted thereon is supported by the stationary frame through vibration-absorbing means (i.e., a floating structure) so as not to directly transmit vibrations from an external to a disk on which recording or reproducing is being performed. The block having such a floating structure (i.e., a floating block) includes a variety of mechanisms such as a disk carriage-driving mechanism which carries a disk inserted to a recording/reproducing position and ejects the disk from the recording/reproducing position, a disk-clamping mechanism which keeps the disk immovable at the recording/reproducing position, and a disk recording/reproducing mechanism which performs recording or reproducing on the disk at the recording/reproducing position (cf. Patent Literature 1).

According to a disk apparatus disclosed in Patent Literature 1, when a disk is inserted from the disk insertion port, the guide pin slides along the circumference edge of the disk and leads the same, and simultaneously, the micro-switch interlocking with the guide pin outputs a disk detection signal to the control circuit. When this disk detection signal is inputted to the control circuit, the reverse rotation motor is driven to rotate the carriage roller in contact with the surface of the disk so as to carry the disk. At this stage, the damper of the disk-clamping mechanism provided in the floating block is lifted so as to ensure the upper side space above the turn table as a disk-carrying space. In addition, the floating block is kept immovable on the stationary frame by locking means interlocking with the guide pin, in other words, the floating block is locked. The disk led to a position above the turn table is held by the damper rotated due to a force from a coil spring, and simultaneously, the locking means for the floating block which holds the disk is disengaged. As a result, the floating block is completely released from the locking means, and the floating block is supported by the vibration-absorbing means alone and thus is put in a floating state, so that recording or reproducing on the disk becomes possible.

In operation for ejecting the disk from the disk apparatus, an ejection signal is inputted to the control circuit to thereby reversely rotate the reverse rotation motor and cause the locking means to lock the floating block. At this stage, the clamper is lifted against the force from the coil spring, and the carriage roller is moved to elastically contact the disk and is started to rotate. The disk in contact with the carriage roller is moved toward the disk insertion port by the rotation of the carriage roller. The reaching of the disk at the ejecting position of the disk insertion port is detected by a detecting means such as a photodiode or the like, and then, the reverse rotation motor is stopped.

Patent Literature 1: JP-A-07-272417 (pages 4 to 6 and FIG. 3)

DISCLOSURE OF THE INVENTION

Problems to be Solved by the Invention

Disk apparatuses, particularly, disk apparatuses for portable use or for equipment on vehicles, are so assembled as to interlock the respective mechanisms which perform the above complicated operations. The floating block of such a disk apparatus, including the respective mechanisms assembled as above, is arranged in a floating state with a predetermined space kept from the stationary frame. In the disk apparatuses for portable use or for equipment on vehicles, the respective mechanisms are arranged and assembled in consideration of the reduction in size, thickness and weight of the disk apparatus. However, some margins are absolutely needed for the space where the disk is carried and for the space where the floating block is held in a floating state in the stationary frame.

An object of the present invention is therefore to provide a disk apparatus reduced in size, thickness and weight, by reducing the space where a disk is carried and the space between a floating block and a stationary frame, as much as possible, with a simple structure.

Means for Solving Problems

A disk apparatus according to the present invention comprises, as described in claim 1, a stationary frame having an opening for inserting or ejecting a disk-shaped recording medium; a disk guide which is rotatably provided in the proximity of the opening of the stationary frame and which leads the insertion and ejection of the disk-shaped recording medium; and a floating unit which is held in a floating state through viscoelastic component in the stationary frame, and which has a function to perform recording and/or reproducing on the disk-shaped recording medium. In this disk apparatus, the floating unit includes a disk-carrying member having a roller arm which rotates itself while pressing the disk-shaped recording medium onto the disk guide so as to carry the disk-shaped recording medium to a desired position. In the disk apparatus thus arranged, the space for carrying the disk-shaped recording medium and the space between the floating unit and the stationary frame, for holding the floating unit, are reduced as much as possible, with a simple structure, so that the size, thickness and weight of the disk apparatus can be reduced.

In the disk apparatus of the present invention, as described in claim 2, the space between the disk guide and the floating unit is used as a space for carrying the disk-shaped recording medium, and also as a space for holding the floating unit in a floating state. In this disk apparatus thus arranged, the space for carrying the disk-shaped recording medium and the space between the floating unit and the stationary frame, for holding the floating unit, are reduced as much as possible, with a simple structure, so that the size, thickness and weight of the disk apparatus can be reduced.

In the disk apparatus of the present invention, as described in claim 3, a desirable sized space for carrying said disk-shaped recording medium is ensured when the roller arm is operated to press the disk-shaped recording medium onto the disk guide. During a recording/reproducing operation, the roller arm is free from the disk guide-pressing operation, and the clamping member presses down the disk-shaped recording medium at a recording/reproducing position, so that the floating unit can be held in a floating state on the stationary frame, with a desired holding space ensured relative to the stationary frame. In the disk apparatus thus arranged, the space for carrying the disk-shaped recording medium and the space between the floating unit and the stationary frame, for holding the floating unit, are reduced as much as possible, with a simple structure, so that the size, thickness and weight of the disk apparatus can be reduced.

In the disk apparatus of the present invention, as described in claim 4, there is further provided a locking mechanism which locks the floating unit to the stationary frame, when the disk-shaped recording medium is inserted and carried, when the same medium is carried and ejected, or when the ejection of the same medium is completed. The disk apparatus thus arranged is reduced in size, thickness and weight and also reliably carries the disk-shaped recording medium.

In the disk apparatus of the present invention, as described in claim 5, when the completion of the ejection of the disk-shaped recording medium is detected, the control slider is moved to cause the projections formed on the control slider to contact the projections formed on the stationary frame, so that a part of the roller arm is engaged with a part of the disk guide. The disk apparatus thus arranged can be reduced in size, thickness and weight, and the floating unit can be reliably locked after the completion of the ejection of the disk-shaped recording medium.

In the disk apparatus of the present invention, as described in claim 6, the roller arm is held oblique to a plane having the opening for the disk insertion and ejection on the stationary frame, so that the disk-shaped recording medium inserted into the opening for the disk insertion and ejection is carried inclining to said plane. In the disk apparatus thus arranged, the disk recording/reproducing position can be set at a desired position within the disk apparatus, which makes it possible to reduce the size, thickness and weight of the disk apparatus.

In the disk apparatus of the present invention, as described in claim 7, the stationary frame comprises two frame sections, i.e., an upper frame and a lower frame, and a projection formed on the disk guide at the rear side of the disk apparatus is engaged with a hole formed in the upper frame so that the disk guide can be rotated a given angle on their engaging portion as a rotation center, relative to the upper frame at the front side of the disk apparatus. This arrangement of the disk apparatus makes it possible to reduce the size, thickness and weight of the disk apparatus.

In the disk apparatus of the present invention, as described in claim 8, the floating unit defined in claim 1 further includes a disk carriage-driving member which comprises a motor for driving the roller arm, a transmission mechanism for transmitting the driving power from the motor to the roller arm, a loading completion detecting means for detecting the completion of disk-loading, and a control slider for transmitting an information detected by said loading completion detecting means to the transmission mechanism. This arrangement of the disk apparatus makes it possible to reduce the size, thickness and weight of the disk apparatus with a simple structure, and also makes it possible to reliably detect the completion of the loading of the disk-shaped recording medium and to reliably perform the subsequent recording/reproducing operation.

In the disk apparatus of the present invention, as described in claim 9, there is provided a locking mechanism which locks the floating unit to the stationary frame, when the control slider is moved according to the operating condition for the disk-shaped recording medium, to cause the projections formed on the control slider to contact the projections formed on the stationary frame. This arrangement of the disk apparatus makes it possible to reduce the size, thickness and weight of the disk apparatus with a simple structure, and also makes it possible to reliably carry the disk-shaped recording medium, by locking the floating unit to the stationary frame according to the operating condition for the disk-shaped recording medium, for example, when the same medium is loaded (or inserted), or when the same medium is unloaded (or ejected).

In the disk apparatus of the present invention, as described in claim 10, the control slider is moved so that the floating unit can be unlocked and held in a floating state, when the disk-carrying member defined in claim 1 has carried the disk-shaped recording medium to the recording/reproducing position. This arrangement of the disk apparatus makes it possible to reduce the size, thickness and weight of the disk apparatus, and also makes it possible to reliably hold the floating unit in a floating state so as not to transmit the vibrations from an external to the floating unit.

In the disk apparatus of the present invention, as described in claim 11, the transmission mechanism for transmitting the driving power from the motor to the roller arm has a worm and a worm wheel divided into two sections along the axial direction of the rotation shaft, and the rotation shaft of the worm wheel is held inclining to a direction orthogonal to the disk-carrying direction. This arrangement of the disk apparatus makes it possible to reduce the size, thickness and weight of the disk apparatus.

EFFECT OF THE INVENTION

According to the present invention, a disk apparatus reduced in size, thickness and weight with a simple structure can be provided, by decreasing the space where a disk-shaped medium is carried and the space where a floating unit is held in a floating state in the stationary frame, as much as possible.

DESCRIPTION OF REFERENCE NUMERALS

1=an upper frame
1a=a hole for engagement
1b=a projection
2=a disk guide
2a=a projection
2b=a claw
3=a clamping member
4=a disk-carrying member
5=a disk carriage-driving member
6=a traverse chassis
7=a disk recording/reproducing-driving member
8=a printed board
9=a lower frame
9a=a recess
10=a floating unit
11=a disk insertion/extraction port
30=a damper
31=a clamper-holding member
32=a clamper arm
33=a damper base
40=a roller arm
40a=a carriage roller
40b=a recess
40c=a claw
40d=a roller arm gear
41=a disk detection lever
42=a disk ejection detection lever
50=a motor
50a=a worm
51=a control slider
51a=a projection
52=a trigger lever
53=a gear train
56=a worm wheel
61=a chin guard
70=a turn table
71=a spindle motor
72=an optical pickup member
73=a motor
81=a detection switch
90=a damper spring
101=a disk

BEST MODES FOR CARRYING OUT THE INVENTION

Hereinafter, preferred embodiments of a disk apparatus according to the present invention will be described with reference to the accompanying drawings.

First Embodiment

Figure 1:
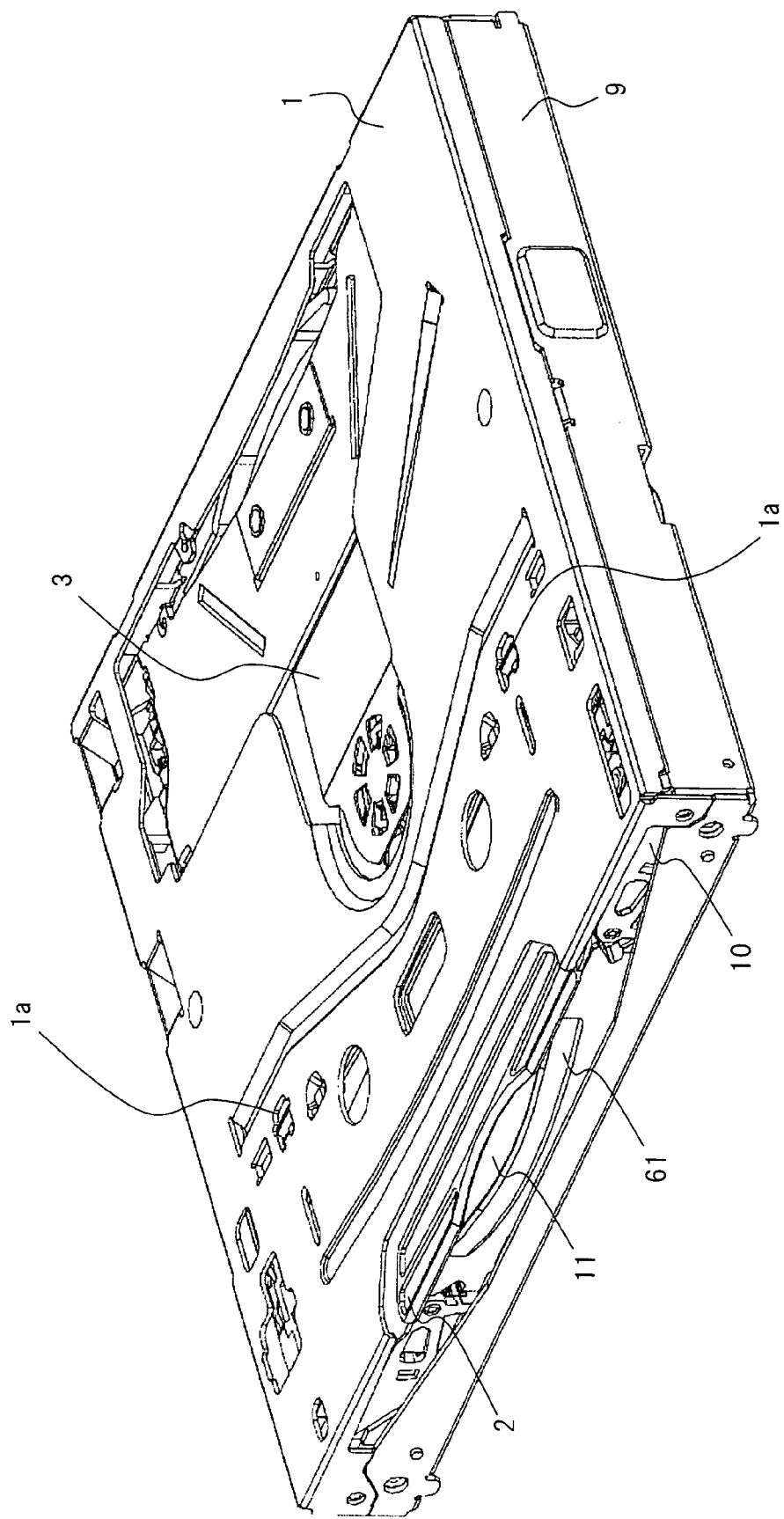
FIG. 1 shows a perspective view of a disk apparatus with an outer casing removed, according to the first embodiment of the present invention.
Figure 2:
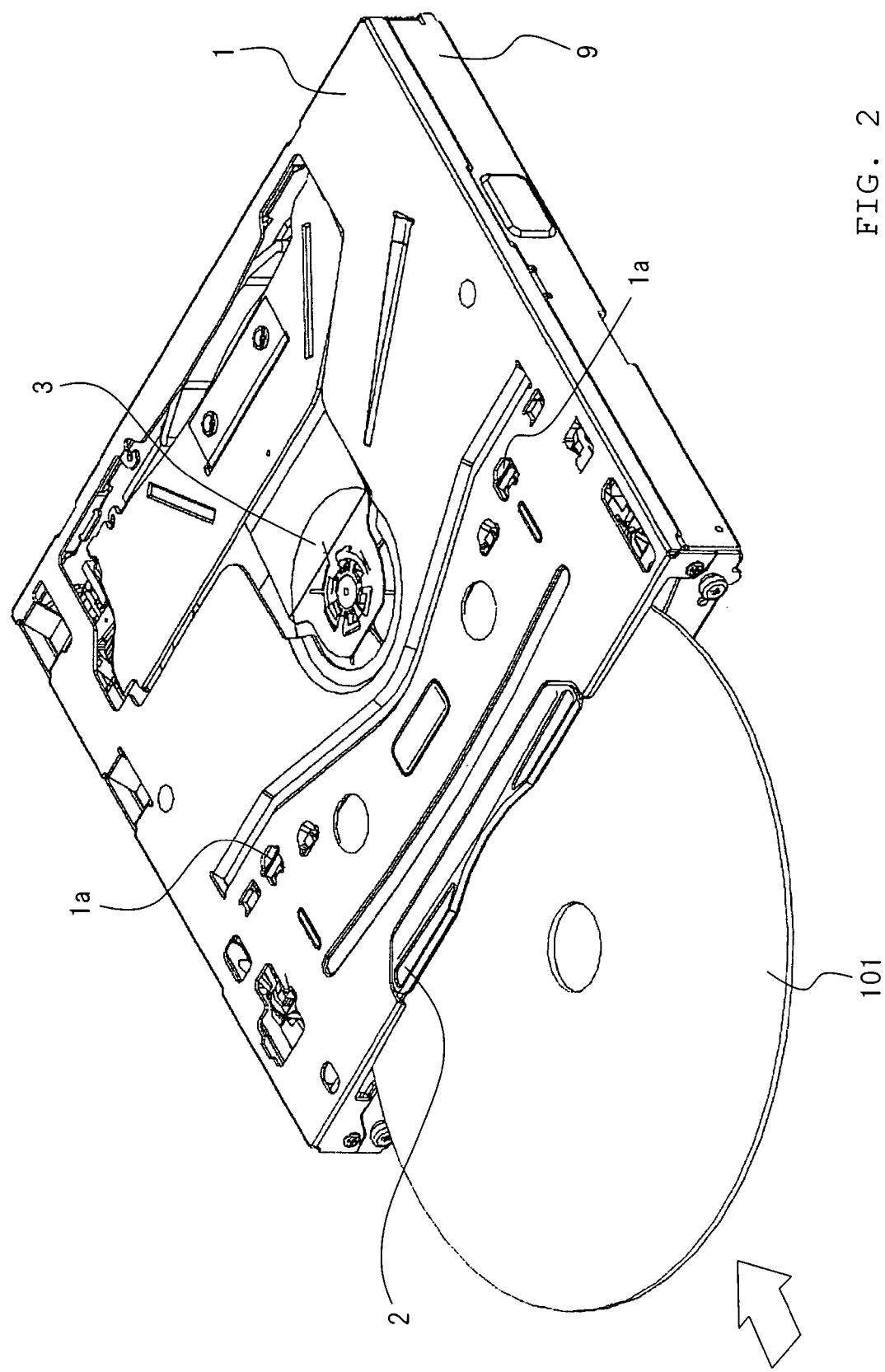
FIG. 2 shows a perspective view of the disk apparatus shown in FIG. 1, into which a disk-shaped recording medium is being inserted.
Figure 3:
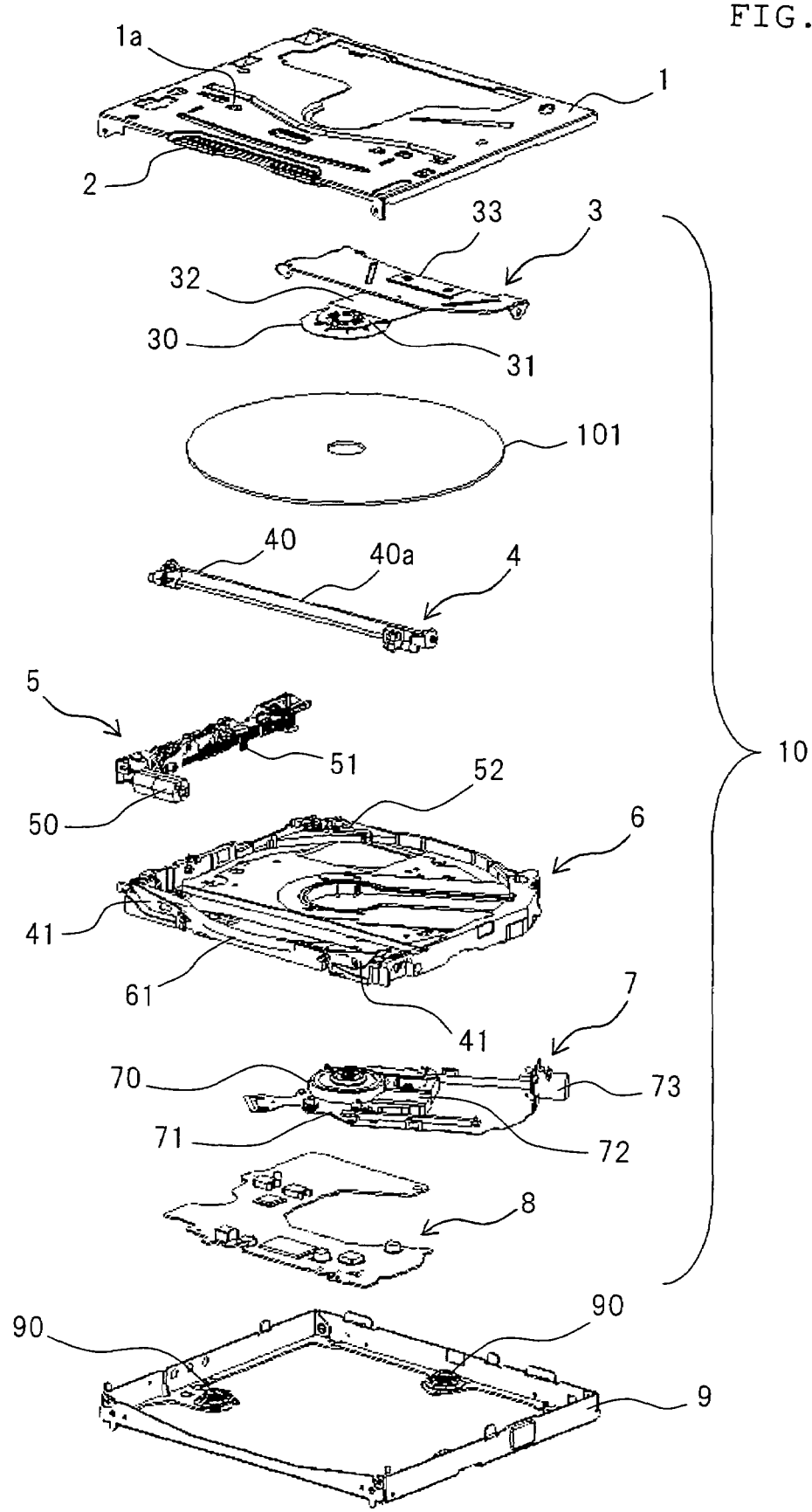
FIG. 3 shows an exploded perspective view of the disk apparatus shown in FIG. 1, illustrating the internal mechanisms thereof.

FIG. 1 is a perspective view showing a disk apparatus without an outer casing, according to the first embodiment of the present invention. FIG. 2 is a perspective view showing the disk apparatus of FIG. 1, into which a disk-shaped recording medium, i.e., a disk, is being inserted. FIG. 3 is an exploded perspective view showing the disk apparatus of FIG. 1, illustrating the internal mechanisms thereof.

The disk apparatus according to the first embodiment shown in FIGS. 1 to 3 has a function to perform recording and reproducing on a disk-shaped recording medium (hereinafter referred to as a disk) 101 such as CD, DVD or the like. The disk 101 is inserted in its diameter direction and loaded on the disk apparatus, to record data thereon or reproduce the date therefrom at the recording/reproducing position.

In the disk apparatus of the first embodiment, the stationary frame fixed on the outer casing comprises two sections, i.e., an upper frame 1 and a lower frame 9, and a floating unit 10 which is elastically supported by a plurality of damper springs 90 made of an elastic material is provided in the stationary frame. The floating unit 10 is held in a floating state while recording or reproducing is being performed on the disk. The floating unit 10 is locked on the stationary frame by the locking mechanism under other conditions except for the recording/reproducing operation. This locking mechanism will be described in detail later.

As is understood from the exploded perspective view shown in FIG. 3, the floating unit 10 comprises a clamping member 3 which holds an inserted disk 101 between itself and the turn table 70; a disk-carrying member 4 which carries the disk 101; a disk carriage-driving member 5 which includes a motor 50 as a driving source for the disk-carrying member 4; a traverse chassis 6 which locates the disk 101 at a desired recording/reproducing position; a disk recording/reproducing-driving member 7 which drives the disk 101 to rotate so as to record data on or reproduce the data from the disk 101; and a printed board 8 which is mounted on a rear face (the reverse of the face for disposing the disk) of the traverse chassis 6 and which has electric circuits for controlling the driving of the respective mechanisms of the floating unit 10, thereon.

Figure 4:
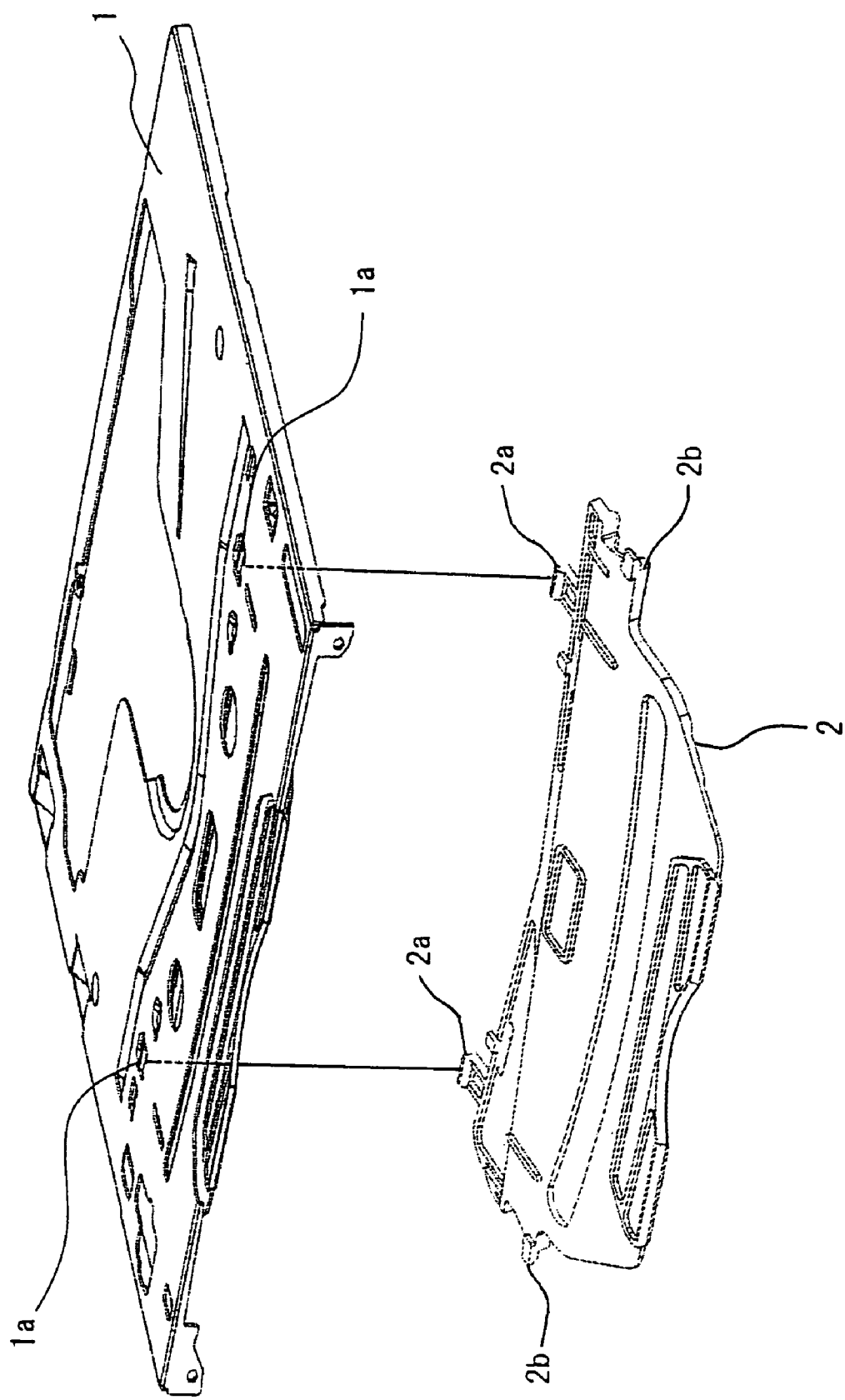
FIG. 4 shows an exploded perspective view of an upper frame 1 of the disk apparatus according to the first embodiment.

FIG. 4 is the exploded perspective view showing the upper frame 1 of the stationary frame. As shown in FIG. 4, the disk guide 2 is rotatably held in suspension at two points from the reverse of the upper frame 1. The two projections 2a, 2a formed on the disk guide 2 at the rear side of the disk apparatus are fitted in and engaged with the holes 1a, 1a formed in the upper frame 1, so that the disk guide 2 can be rotated a predetermined angle on the two engaged parts as the center, relative to the upper frame 1, at the front side of the disk apparatus.

Figure 5:
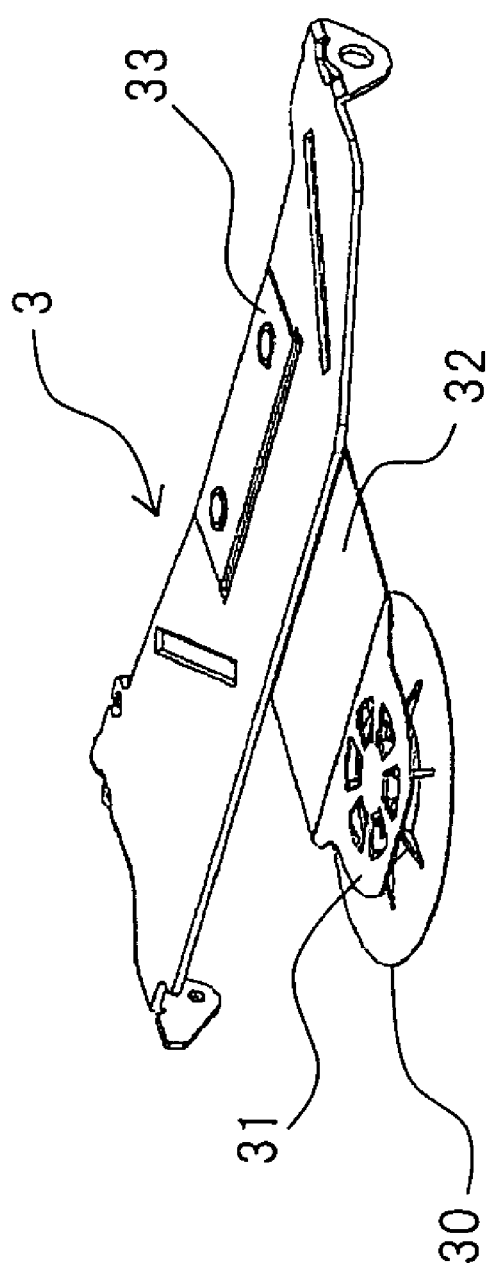
FIG. 5 shows a perspective view of a clamping member 3 of the disk apparatus according to the first embodiment.

FIG. 5 shows a perspective view of the clamping member 3 which holds the disk 101 onto the turn table at a recording/reproducing position. As shown in FIG. 5, the clamping member 3 comprises a damper 30 which is used to press down the inserted disk 101, a clamper-holding part 31 which floatably holds the damper 30, and a damper base 33 which secures the clamper-holding part 31 to the traverse chassis 6 through a damper arm 32. The damper arm 32 which mechanically connects the damper base 33 to the clamper-holding part 31 is made of an elastic material such as a thin metal sheet, and regulates the pressure of the damper 30 for holding down the disk. The damper 30 is held at its center portion by the clamper-holding part 31 while being rotatably engaged with the clamper-holding part 31.

The damper 30 of the clamping member 3 thus arranged is located above the turn table 70, i.e., at a position away from the turn table 70 and in contact with the upper frame 1, when the disk 101 is inserted and carried inside the disk apparatus. In the clamping member 3, the damper base 33 is mounted around the shaft of the traverse chassis 6 of the floating unit 10, and the damper 30 is always urged toward the turn table 70 by urging means (not shown) such as a spring, a clank mechanism or a cam mechanism, provided on the shaft of the traverse chassis. When the disk 101 is not positioned at the recording/reproducing position, the damper 30 is placed in contact with the upper frame 1 by a stopper means, and thus is located at a position away from the turn table 70. When the disk 101 is inserted and carried to the position (the recording/reproducing position) above the turn table 70, the above stopper means is released, so that the urging force from the spring, the clank mechanism or the cam mechanism causes the damper 30 to press down the turn table 70 through the disk 101. As a result, the disk 101 is reliably placed on the turn table 70 and thus is ready for a recording or reproducing operation.

Figure 6:
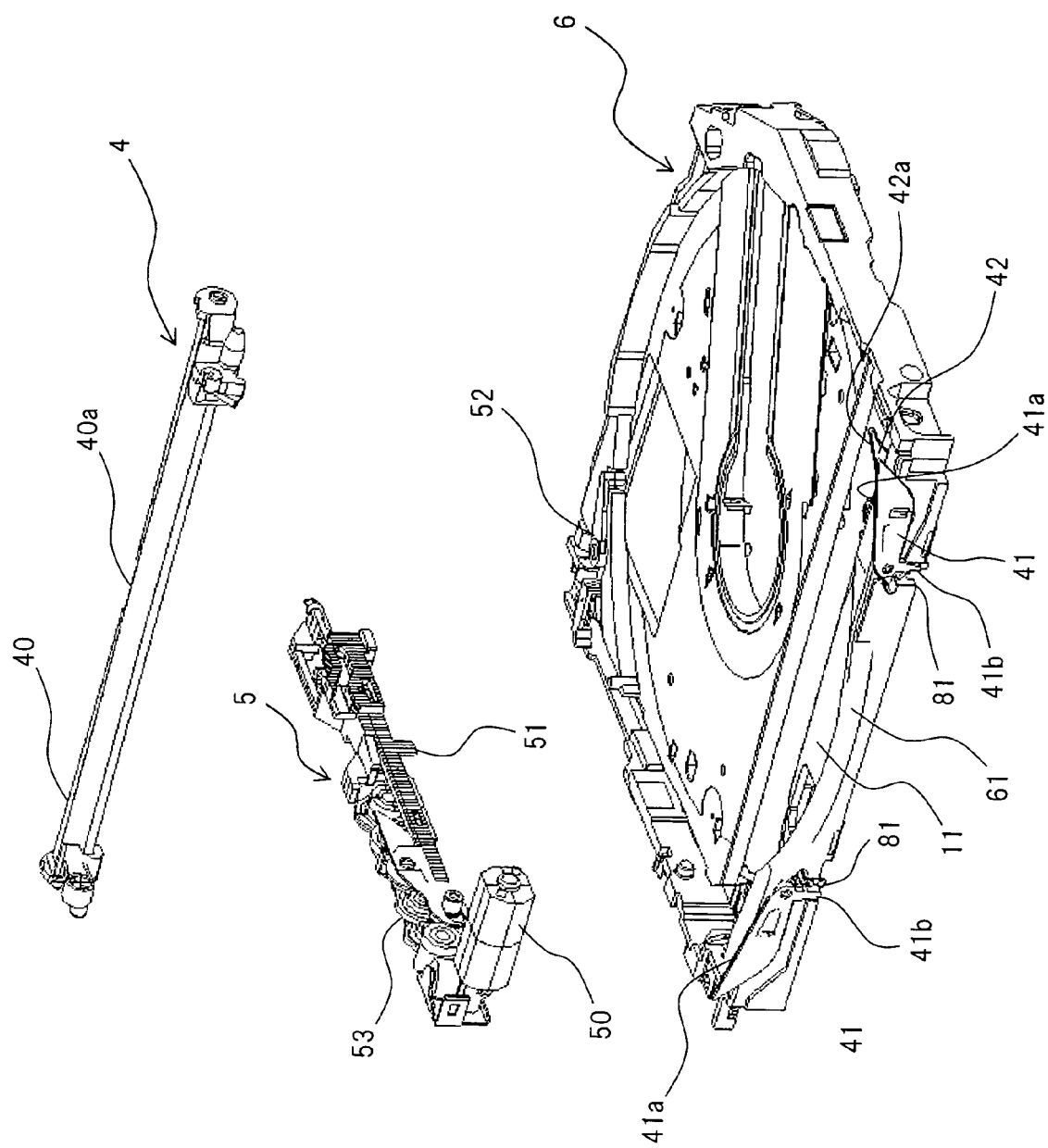
FIG. 6 shows perspective views of a disk-carrying member 4, a disk carriage-driving member 5 and a traverse chassis 6 of a floating unit 10 of the disk apparatus according to the first embodiment.

FIG. 6 shows the perspective views of the disk-carrying member 4, the disk carriage-driving member 5 and the traverse chassis 6 of the floating unit 10 of the disk apparatus of the first embodiment.

The disk-carrying member 4 has a roller arm 40 which rotates itself while pressing the disk 101 onto the disk guide 2 to thereby carry the disk 101 in a given direction in the disk apparatus. The roller arm 40 has a carriage roller 40*a* which is in the shape of two cones connected to each other so that the diameter of the carriage roller 40*a* becomes smaller and smaller at its center portion and becomes larger and larger at its both ends. A part of the carriage roller 40*a* to contact the disk 101 is made of a rubber material. The carriage roller 40*a* of the roller arm 40 thus arranged can contact only the outer circumference of the disk 101 while the disk 101 being carried, so as to protect the recording face of the disk. The carriage roller 40*a* of the roller arm 40 is usually pressed onto the disk guide 2 by the urging force from a spring, while the disk 101 being located at other positions except for the recording/reproducing position. The carriage roller 40*a* is moved downward (in a direction away from the upper frame 1) when the carriage of the disk has been completed and when the disk 101 has reached the recording/reproducing position.

In the disk apparatus of the first embodiment, the rotation shaft of the carriage roller 40*a* is inclined a predetermined angle relative to the front face of the disk apparatus at which the disk insertion/extraction port 11 is provided. This is because it is needed to obliquely carry the disk, since the disk apparatus is not arranged so that the locus of the motion of insertion or ejection of the disk 101 on the traverse chassis 6 can intersect orthogonal to a parallel line to the disk insertion/extraction port 11 of the disk apparatus, in other words, so that the disk 101 can move straightly in the fore and aft direction of the disk apparatus, when the disk apparatus is seen from just above. Therefore, the inserted disk 101 is carried inclining to the front face of the apparatus at which the disk insertion/extraction port 11 is provided. In the first embodiment, the motor 50 of the disk carriage-driving member 5 is disposed in the proximity of the disk insertion/extraction port 11 of the front face of the traverse chassis 6, and a part of the recording/reproducing position is located on the rear side of the motor 50. For this reason, the disk 101 is carried to the disk reproducing position, inclining from the disk insertion/extraction port 11, in the first embodiment.

The disk carriage-driving member 5 shown in FIG. 6 comprises the motor 50 which drives and rotates the roller arm 40 while the disk is being carried (or while the disk being loaded or unloaded) in the disk apparatus; a control slider 51 which has a function to hold the traverse chassis 6 unmoved on the stationary frame before the insertion of the disk or after the completion of ejection of the disk (after the unloading of the disk); a trigger lever 52 which detects the reaching of the disk 101 to the recording/reproducing position after the completion of the loading of the disk; and a gear train 53 which transmits the rotation of the motor 50 to the roller arm 40 and the control slider 51. The trigger lever 52 is located at a position on the rear side of the traverse chassis 6 in FIG. 6, in which one end of the trigger lever 52 is in contact with the rear end portion of the control slider 51, so that the control slider 51 is moved together with the motion of the trigger lever 52. The other end of the trigger lever 52 within the traverse chassis 6 is located at a position where the other end of the trigger lever 52 can contact the edge of the disk 101, when the disk 101 has reached the position above the recording/reproducing position.

The disk recording/reproducing driving member 7 and the printed board 8 are attached on the traverse chassis 6 which has the above disk-carrying member 4 and the above disk carriage-driving member 5 mounted thereon. Provided on the front of the traverse chassis 6 are disk detection levers 41 which are disposed in the proximity of the disk insertion/extraction port 11 so as to detect the insertion of the disk 101 into the disk apparatus, and a disk ejection detecting lever 42 which is disposed at the rear of the disk detection lever 41 so as to detect the ejection of the disk 101. The disk insertion detecting levers 41 and the disk ejection detecting lever 42 are usually urged upward by forces from springs, and thus are located at predetermined positions on the upper side, when the disk 101 is not inserted.

As shown in FIG. 6, the disk detection levers 41 are disposed at and around both sides of the disk insertion/extraction port 11, and are formed in the shapes of blades which spread to both sides and are raised at both ends. When the disk 101 is inserted into the disk insertion/extraction port 11, the outer edge of the disk 101 presses down the detection faces 41*a* (the upper faces as seen in FIG. 6) of either or both of the disk detection levers 41 which are disposed with the outer edge of the disk 101 at their both sides, so that the projections 41*b* formed on the detection levers 41 press down detection switches 81 which are microswitches. When this detection switches 81 are pressed down, the motor 50 capable of reversely rotating is started to rotate in a given direction, to thereby rotate the carriage roller 40*a* of the roller arm 40. As a result, the inserted disk 101 is carried to the recording/reproducing position by the rotation of the carriage roller 40*a* of the roller arm 40.

On the other hand, when the disk 101 is ejected, the motor 50 is rotated in a direction reverse to the direction for the insertion of the disk to thereby rotate the carriage roller 40*a*, so that the disk 101 is carried from the recording/reproducing position to the disk insertion/extraction port 11. The ejection of the disk 101 from the disk insertion/extraction port 11 to a given position is detected by the ejection detecting lever 42. The ejection detecting lever 42 has substantially the same shape as that of the disk detection lever 41, and its upper face serves as the detection face 42*a*. When this detection face 42*a* is away from the outer circumference of the disk 101, the completion of the ejection of the disk 101 is detected, and this disk ejection operation is terminated.

Figure 7:
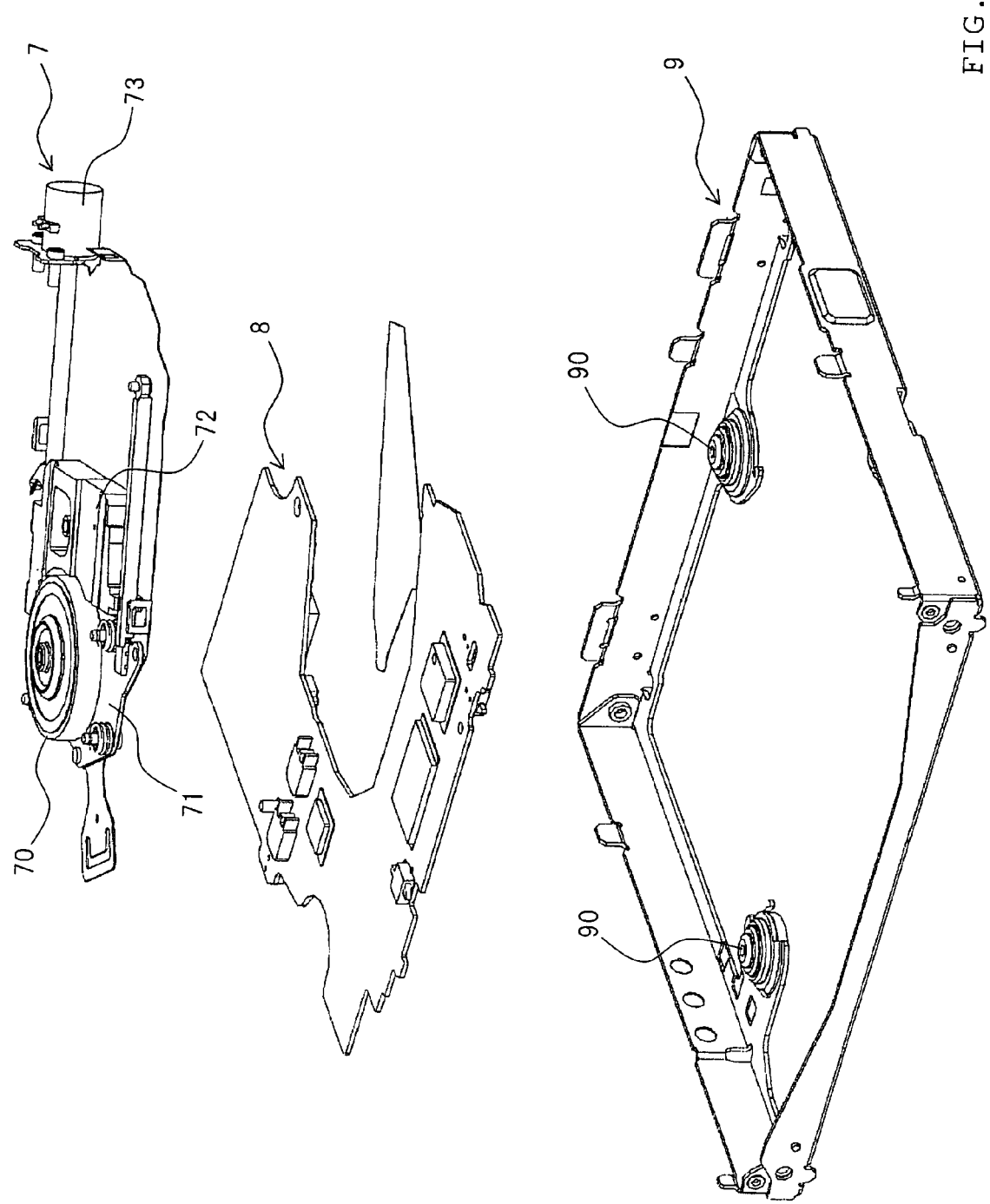
FIG. 7 shows an exploded perspective view of the disk apparatus according to the first embodiment, illustrating a disk recording/reproducing driving member 7, a printed board 8, and a lower frame 90 which supports a traverse chassis 6 through damper springs 90.

FIG. 7 is an exploded perspective view showing the disk recording/reproducing driving member 7, the printed board 8 and the lower frame 9. The lower frame 9 supports the floating unit 10 in a floating state by means of damper springs 90.

As shown in FIG. 7, the disk recording/reproducing driving member 7 includes the turn table 70 which is rotated with the disk 101 placed thereon, the spindle motor 71 for rotating the turn table 70, an optical pickup member 72 which records data on or reproduce the data from the disk 101, and an optical pickup driving motor 73 which drives the optical pickup member 72 in the diameter direction of the disk 101. The printed board 8 is attached on the reverse of the traverse chassis 6, and has electric circuits formed thereon for controlling the driving of the respective mechanisms provided on the traverse chassis 6.

The floating unit 10 thus arranged is supported on the lower frame 9 as the stationary frame secured on the casing, through the damper springs 90 having viscoelastic functions. Before the insertion of the disk, the floating unit 10 is pressed onto the disk guide 2 by the control slider 51 and the roller arm 40, and thus is located at a position on the lower side in the frame comprising the upper frame 1 and the lower frame 9. When the disk 101 is inserted in this state, the disk 101 enters between the roller arm 40 and the disk guide 2, and is then carried to the recording/reproducing position. When the disk 101 has reached the recording/reproducing position, the floating unit 10 is put in a floating state and is lifted. And then the disk 101 is held between the turn table 70 and the damper 30.

In operation of extraction of the disk 101, the floating unit 10 is pressed onto the disk guide 2 by the roller arm 40 and the control slider 51 to thereby compress the damper springs 90, so that the floating unit 10 is moved downward and is located at the lower position in the stationary frame.

Next, the operation of the disk apparatus of the first embodiment will be described.

Figure 8:
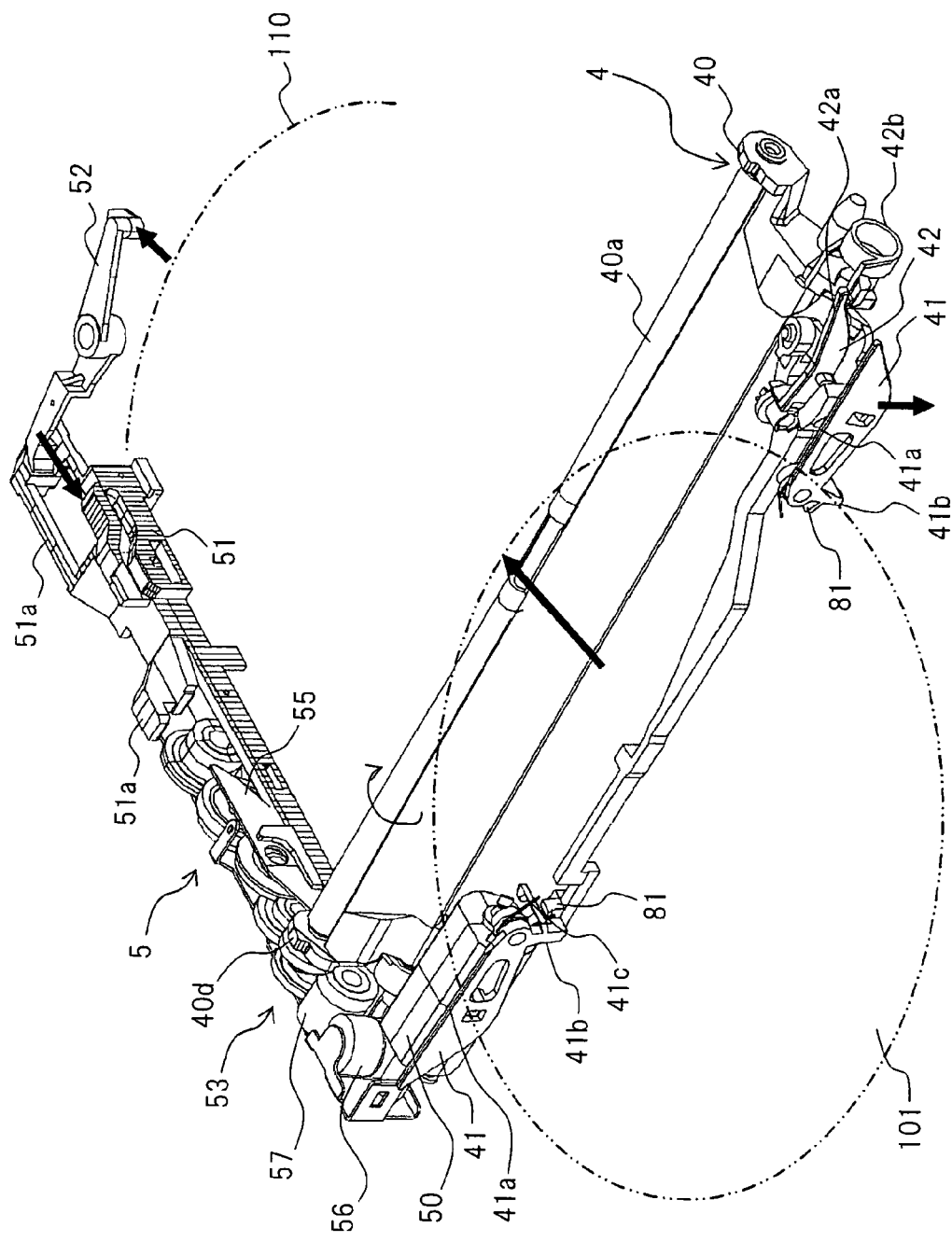
FIG. 8 shows an enlarged perspective view of the disk-carrying member 4 and the disk carriage-driving member 5 in the disk apparatus according to the first embodiment.
Figure 10:
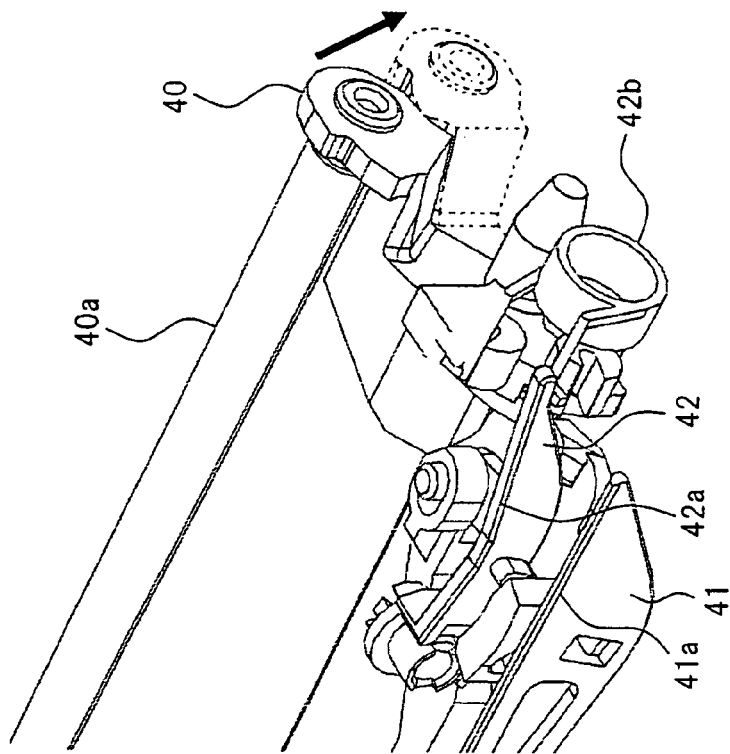
FIG. 10 shows a perspective view of a right side section of the disk-carrying member 4 which is seen from the front side of the disk apparatus.
Figure 9:
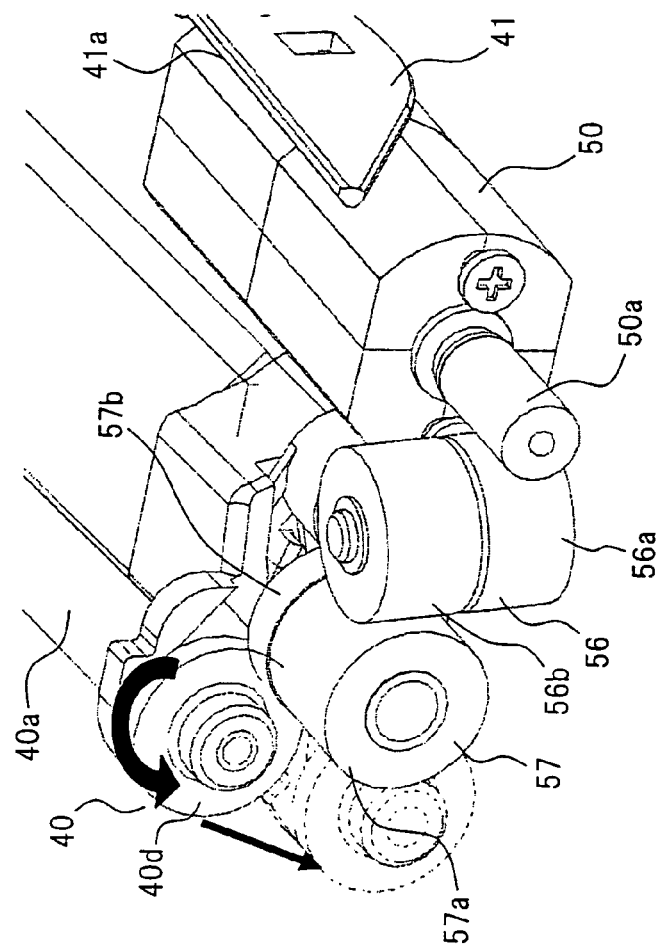
FIG. 9 shows a perspective view of the mechanism in the proximity of a motor 50 in the disk carriage-driving member 5.
Figure 11:
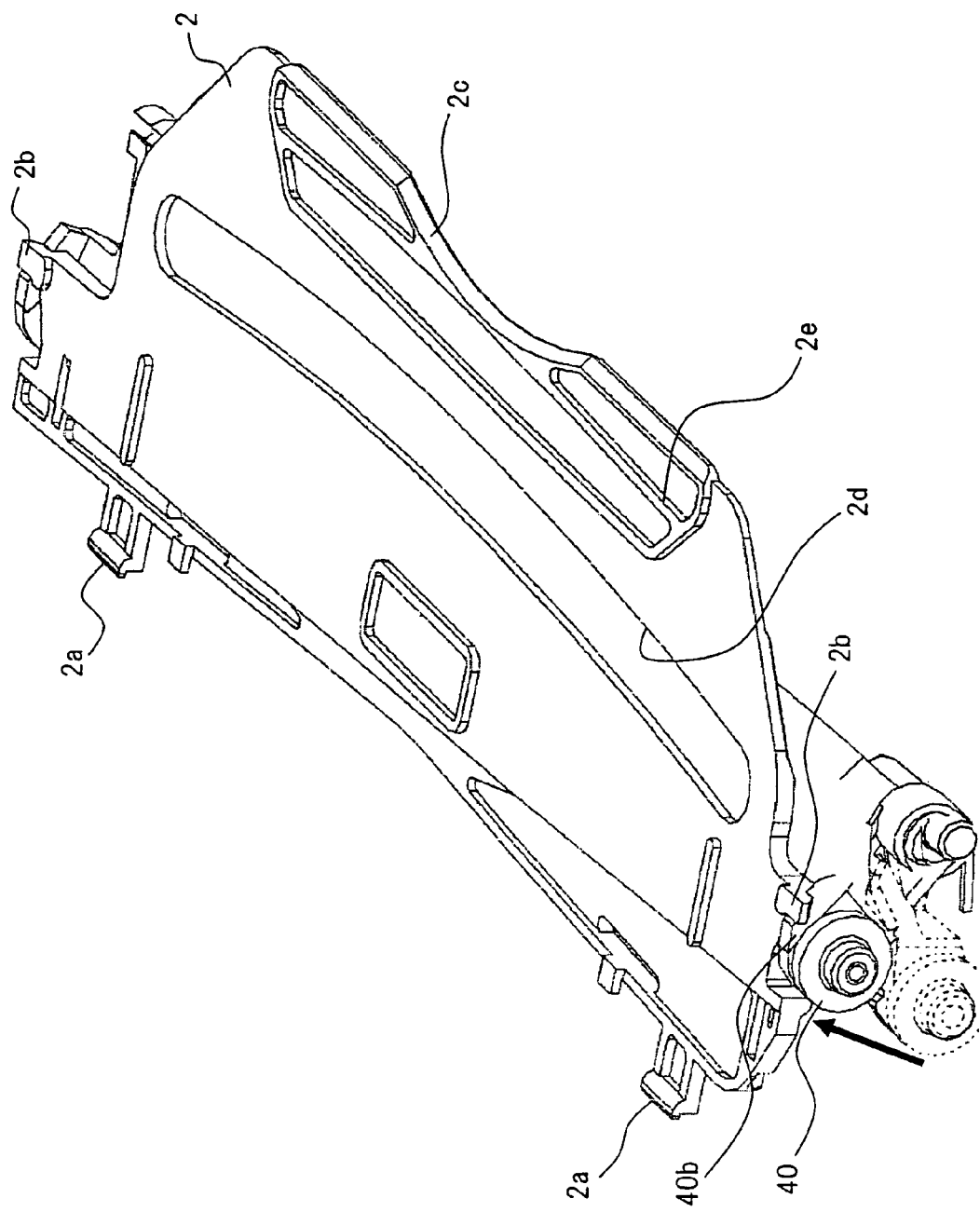
FIG. 11 shows a perspective view of the disk-carrying member 4 and a disk guide 2, illustrating their positional relationship for engagement.
Figure 12:
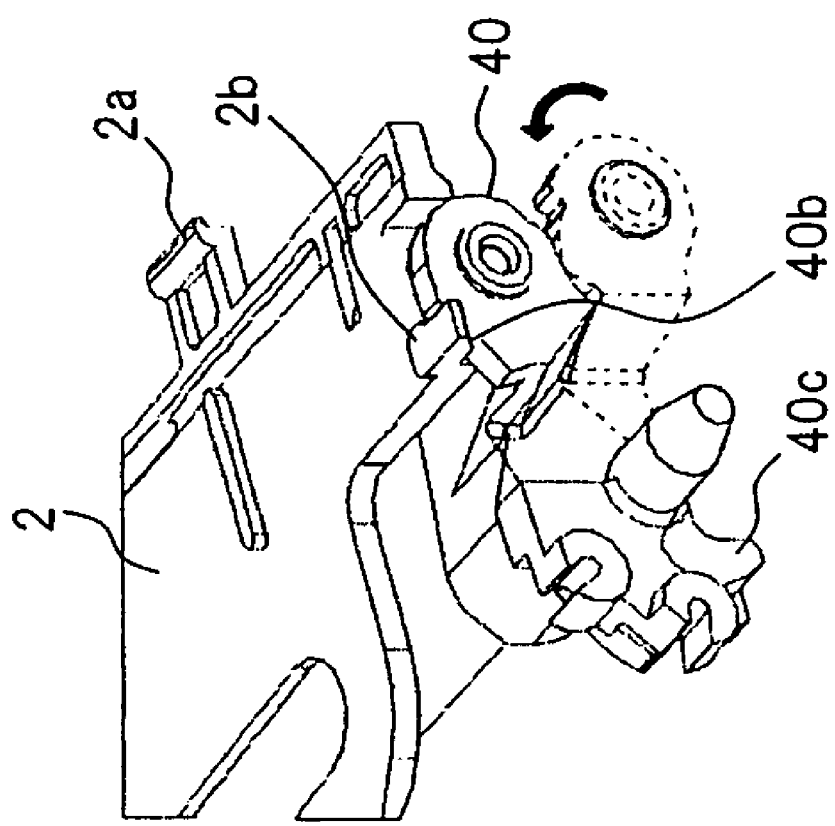
FIG. 12 shows a perspective view of the right side section of the disk-carrying member 4 which is seen from the front side of the disk apparatus shown in FIG. 11.

FIG. 8 is an enlarged perspective view showing the disk-carrying member 4 and the disk carriage-driving member 5 of the disk apparatus of the first embodiment. FIG. 9 is a perspective view showing the mechanism in the vicinity of the motor 50 of the disk carriage-driving member 5. FIG. 10 is a perspective view showing the right side section of the disk-carrying member 4 which is seen from the front side of the disk apparatus. FIG. 11 is a perspective view showing positional relationship for engagement between the disk-carrying member 4 and the disk guide 2. FIG. 12 is a perspective view showing the right side section of the disk-carrying member 4 which is seen from the front side of the disk apparatus shown in FIG. 11.

FIG. 8 shows the condition of the disk apparatus of the first embodiment while the disk 101, drawn by the two-dot chain lines, is being inserted. When the disk 101 is inserted from the disk insertion/extraction port 11, the disk detection levers 41 are pressed down against the forces from the springs 41c, so that the detection switches 81 are turned on to transmit a disk detection signal to the electric circuit of the printed board 80. As a result, the motor 50 is rotated in the disk-inserting direction, and the rotation-driving force from the motor 50 is transmitted to roller arm 40 through the gear train 53.

FIG. 9 illustrates the transmission mechanism by which the rotation-driving force from the motor 50 is transmitted to the roller arm 40. As shown in FIG. 9, this transmission mechanism comprises a worm 50a mounted on the rotation shaft of the motor 50; a worm wheel 56 having two-staged upper and lower tooth, i.e., a gear 56a meshing with the worm 50a and a gear 56b coaxially mounted on the gear 56a; an intermediate gear 57; and a roller arm gear 40d. The intermediate gear 57 includes a gear 57a which meshes with the upper gear 56b of the worm wheel 56, and a gear 57b which meshes with the roller arm gear 40d.

The rotation shaft of the worm wheel 56 in this transmission mechanism is inclined to a direction perpendicular to the disk-inserting direction, in other words, arranged in a substantially vertical direction. In the first embodiment, the worm wheel 56 is inclined 15 degrees relative to the vertical direction and toward the rear side of the disk apparatus. This inclining angle, 15 degrees, described in this embodiment, is merely one of examples, and the scope of the present invention is not limited to this value. Therefore, there is no limit in selection of an angle suitable for the structure of the disk apparatus.

As described above, by inclining the rotation shaft of the worm wheel 56, the horizontal level of the meshing position of the worm 50a of the motor 50 can be approximated to the horizontal level of the meshing position of other gear, and therefore, it is not needed to lower the position of the motor 50 in a direction to increase the thickness of the disk apparatus, namely, downward. Again, by inclining the rotation shaft of the worm wheel 56, it becomes possible to dispose the gear train in a smaller space, as compared with the case where the rotation shaft of the worm wheel 56 is stood vertically. Accordingly, the gear train 53 of the transmission mechanism thus arranged can attain a desired transmitting function in a smaller space. Therefore, the disk apparatus having such a gear train 53 can be provided with reduced thickness and size. Further, according to the disk apparatus of the first embodiment, the transmission mechanism for transmitting the rotation-driving force from the motor 50 to the roller arm 40 is composed of a smaller number of components. Therefore, a whole of the disk apparatus is accomplished with a smaller number of components and a reduced weight.

When the loading of the disk 101 on the disk apparatus of the first embodiment is completed, that is, when the disk 101 is located at the recording/reproducing position, the carriage roller 40a of the roller arm 40 is moved away (or downward) from the upper frame 1, as mentioned above. The completion of the loading of the disk 101 is detected, when the disk 101 presses down the trigger lever 52. When one end of the trigger lever 52 is pressed down by the disk 101, the other end of the trigger lever 52 slides the control slider 51 forward in the disk apparatus (see FIG. 8). When the control slider 51 slides forward, the roller control arm 55 rotates the roller arm 40 downward to a given position. As a result, the guide plate 2 in contact with the carriage roller 40a of the roller arm 40 is held in suspension from the upper frame 1, and comes into contact with the chin guard 61 of the traverse chassis 6 to close the disk insertion/extraction port 11. Thus, an insertion of a second disk 101 from the disk insertion/extraction port 11 is reliably inhibited, when the first disk 101 has already been placed at the recording/reproducing position.

Again, when the one end of the trigger lever 52 is pressed down by the disk 101 to thereby slide the control slider 51 forward, the two projections 51a, 51a of the control slider 51 are away from the projections 1b, 1b formed on the reverse side of the upper frame 1 (described later in connection with FIG. 14), so that the floating unit 10 is unlocked and is put in a floating state. When the disk 101 is placed at the recording/reproducing position as described above, the floating unit 10 is put in this floating state and is ready for a recording or reproducing operation.

The position of the level of the floating unit 10 in the floating state relative to the vertical direction (or the width-wise direction of the disk apparatus) is located above the position of the level thereof found when the carriage roller 40a of the roller arm 40 presses the disk 101 onto the guide plate 2 to carry the disk 101 (during the loading operation). This is because the roller arm 40 provided on the floating unit 10 presses the guide plate provided on the stationary frame (or the upper frame 1). Therefore, the floating unit 10 is located downward while the disk is being carried, in order to ensure the disk-carrying space so that the disk can be placed at the recording/reproducing position.

Next, when an instruction for the ejection of the disk 101 at the recording/reproducing position is transmitted, the roller arm 40 is rotated to move upward, together with the guide plate 2, by the roller control arm 55. At this time, the carriage roller 40a of the roller arm 40 starts to rotate itself in the disk-ejecting direction to thereby eject the disk 101 while pressing the disk 101 onto the guide plate 2. Since the control slider 51 is slid backward at this time, the projections 51a, 51a of the control slider 51 come into contact with the projections 1b, 1b of the upper frame 1 as the stationary frame to thereby lock the floating unit 10 having the control slider 51 provided thereon. In this locking state, the damper springs 90 between the floating unit 10 and the lower frame 9 are compressed.

When an user removes the disk 101 from the disk apparatus after the disk ejection-detecting lever 42 has detected the ejection of the disk 101, the roller arm 40 is free from the driving control by the roller control arm 55, and is moved upward to the upper frame 1 according to the forces from the springs, and the engaging part 40b of the roller arm 40 is engaged with the claw 2b of the disk guide 2 in contact with the upper frame 1. FIG. 11 shows the perspective view of the disk guide 2 and the roller arm 40, illustrating the engagement of the claw 2b of the disk guide 2 with the part 40b of the roller arm 40. FIG. 12 shows the perspective view of the right side of the front of the disk apparatus, illustrating the engagement of the claw 2b of the disk guide 2 with the part 40b of the roller arm 40.

Figure 13:
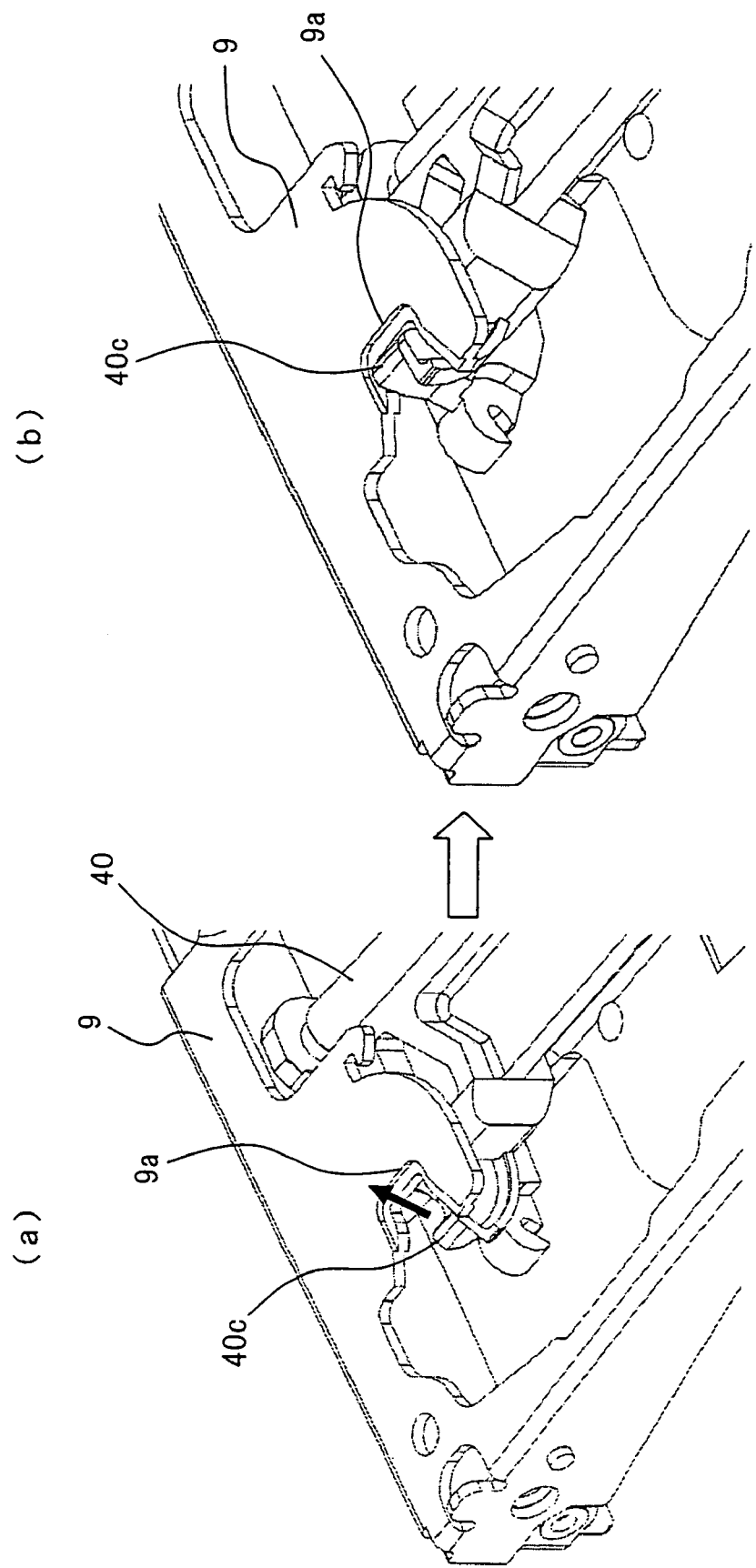
FIG. 13 shows enlarged perspective views of a part of the reverse side of the disk apparatus according to the first embodiment, illustrating an operation of engaging a claw 40c of a roller arm 40 with a recess 9a of a lower frame 9.

According to the disk apparatus of the first embodiment, when the user removes the disk 101 from the disk apparatus after the completion of the ejection of the disk 101, the roller arm 40 is moved upward to the upper frame 1 due to the urging forces from the springs, to thereby engage the claw 2b of the disk guide 2 with the part 40b of the roller arm 40, and simultaneously engage the claw 40c of the roller arm 40 with the recess 9a of the lower frame 9 of the stationary frame, so that the rotation of the roller arm 40 is inhibited. FIG. 13 shows the enlarged perspective views of a part of the reverse side of the disk apparatus of the first embodiment, illustrating the engaging operation for the claw 40c of the roller arm 40 and the recess 9a of the lower frame 9, (a) of FIG. 13 shows the claw 40c of the roller arm 40 and the recess 9a of the lower frame 9 while a recording or reproducing operation is being performed on the disk, and (b) of FIG. 13 shows the engagement of the claw 40c of the roller arm 40 with the recess 9a of the lower frame 9, when the ejection of the disk has been completed.

When the operation of inserting and carrying the disk 101 (the loading operation) is completed with the contact of the disk 101 to the trigger lever 52 as described above, the control slider 51 of the disk carriage-driving member 5 is slid forward in the disk apparatus to thereby move the projections 51a, 51a of the control slider 51 away from the projections 1b, 1b formed on the reverse side of the upper frame 1. As a result, the floating unit 10 is put in a floating state.

Figure 14:
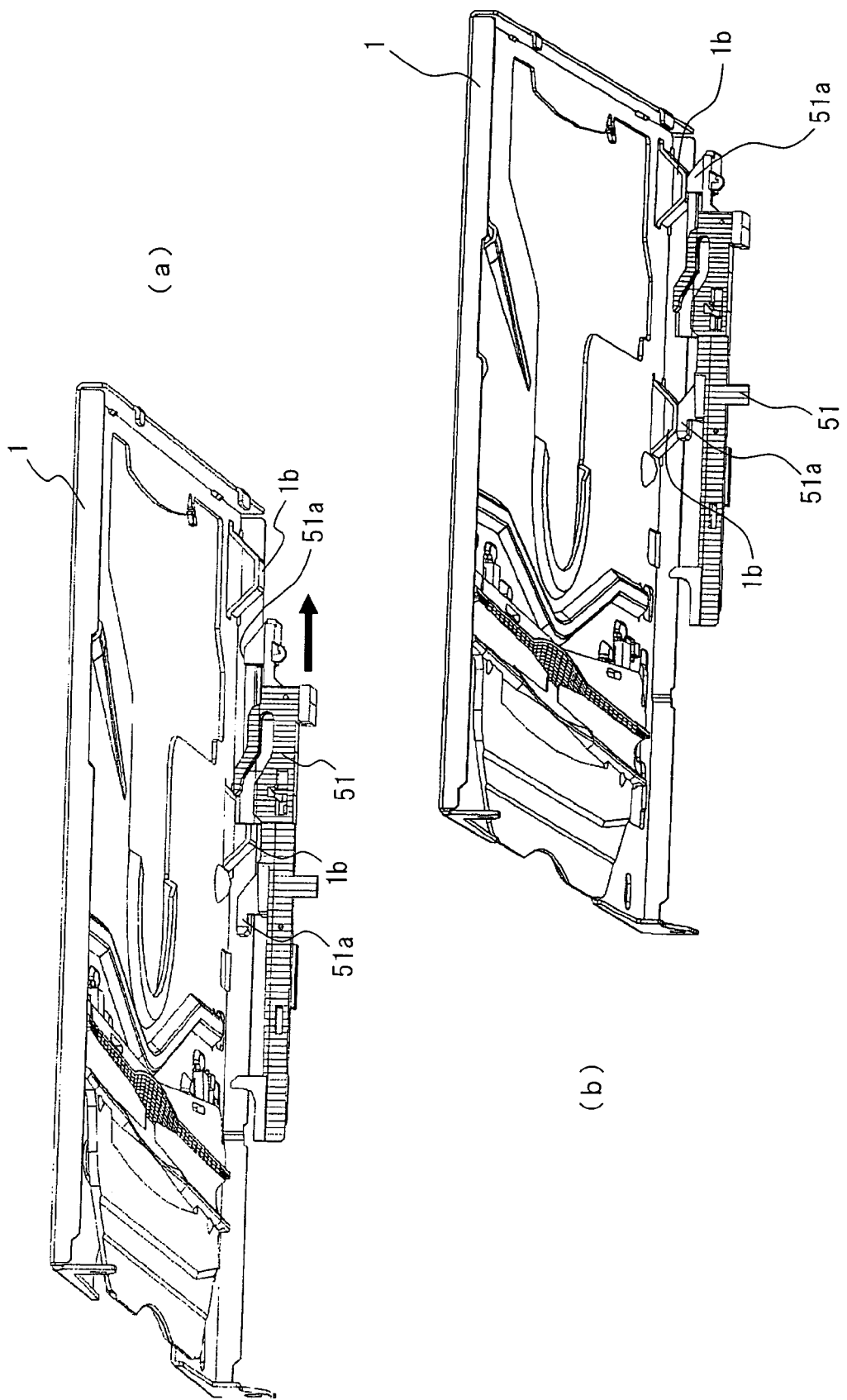
FIG. 14 shows perspective views of the upper frame 1 and a control slider 51, seen from below, illustrating the contact condition between the upper frame 1 and the control slider 51.

(a) of FIG. 14 shows the perspective view of the control slider 51 and the upper frame 1, illustrating their positional relationship found when the projections 51a, 51a of the control slider 51 are moved away from the projections 1b, 1b of the upper frame 1. In (a) of FIG. 14, the upper frame 1 is viewed from below. (b) of FIG. 14 shows the positional relationship between the control slider 51 and the upper frame 1, when the upper frame 1 is in the locking state during the carrying operation for the disk 101 or after the completion of the ejection of the disk 101. As shown in (b) of FIG. 14, the projections 51a, 51a of the control slider 51 are in contact with the projections 1b, 1b of the reverse side of the upper frame 1, respectively.

As described above, in the disk apparatus of the first embodiment, the projections 51a, 51a of the control slider 51 are in contact with the projections 1b, 1b of the upper frame 1 after the completion of the ejection of the disk 101, and simultaneously, the claw 2b of the disk guide 2 is engaged with the part 40b of the roller arm 40 (see FIGS. 11 and 12) and the claw 40c of the roller arm 40 is engaged with the recess 9a of the lower frame 9 (see (b) of FIG. 13). As a result, in the disk apparatus of the first embodiment, the floating unit 10 is reliably secured to the stationary frame after the completion of the ejection of the disk 101.

As has been fully described above, the disk apparatus of the first embodiment of the present invention can be provided with reduced thickness and size, since the disk guide 2 for carrying a disk is provided on the upper frame 1 as the stationary frame, as compared with the case where the disk guide is provided on the floating unit. This is because the disk guide provided on the floating unit requires a space between the disk guide and the stationary frame so as to put the floating unit in a floating state. In contrast, in the disk apparatus of the first embodiment of the present invention, the disk guide 2 is provided on the stationary frame and thus does not require a space between the disk guide 2 and the stationary frame. Further, in the disk apparatus of the first embodiment of the present invention, the space between the disk guide 2 and the floating unit 10 can be used as the space for carrying the disk as well as the space for holding the floating unit 10 in a floating state. Furthermore, in the disk apparatus of the present invention, the roller arm 40 is operated to press the disk onto the disk guide 2 while the disk is being carried, to thereby form a desired disk-carrying space. Then, the roller arm 40 is rotated to cause the clamping member 3 to perform a disk-claiming operation during the recording/reproducing operation. By doing so, the floating unit 10 is put in a floating state with a desired holding space ensured relative to the stationary frame. Thus, the disk apparatus of the present invention can be provided with a reduced size, thickness and weight, while ensuring a desired disk-carrying space and a desired holding space.

In this regard, the foregoing embodiment has been described as the disk apparatus capable of performing both of recording and reproducing. However, the scope of the present invention is not limited to such a disk apparatus, and also may include other disk apparatuses such as recording disk apparatuses and reproducing disk apparatuses for disk-shaped recording media.

INDUSTRIAL APPLICABILITY

The present invention is especially useful for compact disk apparatuses which perform recording or reproducing on disk-shaped recording media such as CD and DVD. The present invention makes it possible to provide a thinner disk apparatus capable of reliably claiming a disk inserted into the disk apparatus, in spite of its reduced thickness.

What is claimed is:
1. A disk apparatus comprising:
a stationary frame having an opening for inserting or ejecting a disk-shaped recording medium,
a disk guide which is rotatably provided in the proximity of said opening of said stationary frame, and which leads the insertion and ejection of said disk-shaped recording medium, and a floating unit which is held in a floating state through elastic component in said stationary frame, and which has a function to perform recording and/or reproducing on said disk-shaped recording medium, wherein said floating unit includes a disk-carrying member having a roller arm which rotates itself while pressing said disk-shaped recording medium onto said disk guide, so as to carry said disk-shaped recording medium to a desired position, and when the completion of the ejection of said disk-shaped recording medium is detected, a control slider is moved to allow a projection formed on said control slider to contact a projection formed on said stationary frame, to thereby engage a part of said roller arm with a part of said disk guide.

2. A disk apparatus comprising:

a stationary frame having an opening for inserting or ejecting a disk-shaped recording medium, a disk guide which is rotatably provided in the proximity of said opening of said stationary frame, and which leads the insertion and ejection of said disk-shaped recording medium, and a floating unit which is held in a floating state through elastic component in said stationary frame, and which has a function to perform recording and/or reproducing on said disk-shaped recording medium, wherein said floating unit includes a disk-carrying member having a roller arm which rotates itself while pressing said disk-shaped recording medium onto said disk guide, so as to carry said disk-shaped recording medium to a desired position, and said roller arm is held obliquely to a plane having said opening for disk insertion and ejection on said stationary frame, so that said disk-shaped recording medium inserted into said opening for said disk insertion and ejection is carried inclining to said plane.

3. A disk apparatus comprising:

a stationary frame having an opening for inserting or ejecting a disk-shaped recording medium, a disk guide which is rotatably provided in the proximity of said opening of said stationary frame, and which leads the insertion and ejection of said disk-shaped recording medium, and a floating unit which is held in a floating state through elastic component in said stationary frame, and which has a function to perform recording and/or reproducing on said disk-shaped recording medium, wherein said floating unit includes a disk-carrying member having a roller arm which rotates itself while pressing said disk-shaped recording medium onto said disk guide, so as to carry said disk-shaped recording medium to a desired position, and said stationary frame comprises two frame sections having an upper frame and a lower frame, and wherein a projection formed on said disk guide at the rear side of said disk apparatus is engaged with a hole formed in said upper frame, so that said disk guide is rotated a predetermined angle on their engaging portion as a rotation center, relative to said upper frame at the front side of said disk apparatus.

4. A disk apparatus comprising:

a stationary frame having an opening for inserting or ejecting a disk-shaped recording medium, a disk guide which is rotatably provided in the proximity of said opening of said stationary frame, and which has a function to perform recording and/or reproducing on said disk-shaped recording medium, wherein a floating unit which is held in a floating state through elastic component in said stationary frame, and which has a function to perform recording and/or reproducing on said disk-shaped recording medium, wherein said floating unit includes a disk-carrying member having a roller arm which rotates itself while pressing said disk-shaped recording medium onto said disk guide, so as to carry said disk-shaped recording medium to a desired position, and said floating unit further includes a disk carriage-driving member which comprises a motor for driving said roller arm, a transmission mechanism for transmitting the driving power from said motor to said roller arm, a loading completion detecting means for detecting the completion of disk-loading, and a control slider for transmitting an information detected by said loading completion detecting means to said transmission mechanism.

5. The disk apparatus as recited in claim 4, wherein a space between said disk guide and said floating unit is used as a space for carrying said disk-shaped recording medium, and as a space for holding said floating unit in a floating state.

6. The disk apparatus as recited in claim 4, wherein a desirable sized space for carrying said disk-shaped recording medium is formed when said roller arm is operated to press said disk-shaped recording medium onto said disk guide while said disk-shaped recording medium onto said disk guide while said disk-shaped recording medium is being carried, and wherein a desired space for holding said floating unit in a floating state in said stationary frame is ensured, when said clamping member performs a clamping operation to clamp said disk-shaped recording medium at a recording/reproducing position during a recording/reproducing operation, after said roller arm is free from the pressing operation to said disk guide.

7. The disk apparatus as recited in claim 4, further comprising a locking mechanism which locks said floating unit to said stationary frame, when said disk-shaped recording medium is inserted and carried, when said disk-shaped recording medium is carried and ejected, or when the ejection of said disk-shaped recording medium is completed.

8. The disk apparatus as recited in claim 4, provided with a locking mechanism which locks said floating unit to said stationary frame, when said control slider is moved according to the operating condition of said disk-shaped recording medium, and a projection formed on said control slider contacts with a projection formed on said stationary frame.

9. The disk apparatus as recited in claim 4, wherein said control slider is moved to unlock said floating unit and hold it in a floating state, when said disk-carrying member has carried said disk-shaped recording medium to a recording/reproducing position.

10. The disk apparatus as recited in claim 4, wherein the transmission mechanism for transmitting the driving power from said motor to said roller arm includes a worm and a worm wheel divided into two section along a rotation axial direction, and wherein the rotation shaft of said worm wheel is inclined to a direction orthogonal to the direction for carrying said disk-shaped recording medium.

* * * * *